United States Patent Office 2,831,888
Patented Apr. 22, 1958

2,831,888
PROCESS FOR THE PREPARATION OF ORTHO-CARBOXY-HYDROCINNAMIC ACID

Pierre de Radzitzky, Urbana, Ill., and Jean Claude Balaceanu, Paris, France, assignors to Institut Francais du Petrole des Carburants et Lubrifiants, Rueil-Malmaison, France No Drawing. Application November 23, 1954
Serial No. 470,796

Claims priority, application France November 26, 1953

9 Claims. (Cl. 260—523)

The present invention relates to the manufacture of ortho-carboxy-hydrocinnamic acid:

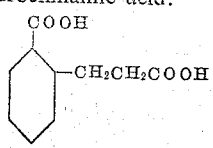

Ortho-carboxy-hydrocinnamic acid yields—

(a) By polycondensation with triols: tridimensional polyesters of the glyptal type (polycondensate of glycerine and phthalic acid);

(b) By polycondensation with diols: monodimensional polymers of melting points which vary according to the diol employed;

(c) By polycondensation with diamines, polymers possessing strong intermolecular attractions (as in the case of nylon which is a polycondensate of adipic acid and hexamethylenediamine);

(d) By polycondensation with straight-chain or branched-chain amino alcohols: mixed condensates partaking of the properties of the preceding two types.

In view of these various utilization possibilities, a practical process for the manufacture of the said ortho-carboxy-hydrocinnamic acid is of manifest industrial interest.

There has heretofore been no simple and economical synthesis of the said acid which, because of the lack of an industrial and economically feasible method of manufacture, has been of purely theoretical interest. The known methods of manufacture, based on the permanganic, nitric, chromic, or oxygenic degradation of the hydrogenated ring of tetrahydronaphthalene, of β tetrahydronaphtol, or of α or β tetrahydronaphthylamine, give only traces of the desired product, and the syntheses by combinations of simpler structures such as those starting from orthosubstituted derivatives of cinnamic acid are long and costly and, moreover, incapable of utilization on an industrial scale.

The primary object of the present invention is the embodiment of a simple, economical and practical process for the manufacture of ortho-carboxy-hydrocinnamic acid.

The starting material in the method according to the present invention, which constitutes a realization of the said object, is either tetralone, an economical synthetic method for the manufacture of which is described and claimed in copending application, Serial No. 470,797, filed on even date herewith, for Process for the Manufacture of Bicyclic Ketones, or the crude products of the oxidation of 1,2,3,4-tetrahydronaphthalene obtained according to the method of the said copending application. This, briefly stated, involves the oxidation, in the liquid phase and with the aid of an oxygen-containing gas, of a hydrocarbon such as 1,2,3,4-tetrahydronaphthalene at a temperature of 100–200° C. in the presence of a monobasic organic acid solvent, such as acetic acid, propionic acid, butyric acid or the like, and in the presence of an oxidation catalyst.

According to the process of the present invention, the tetralone—as such or in the form of the aforesaid crude tetralone-containing mixture—is oxidized by the action of nitric acid, the active agent being $NO_2$. It is preferred that the nitric acid be of a density lower than 1.40, the most favorable oxidation conditions being obtained with a nitric acid of a density between 1.20 and 1.34 at a temperature preferably between 75° C. and 125° C. under atmospheric pressure. While these are the preferred conditions, the invention is not limited thereto, and nitric acids of other concentrations and/or other temperatures may also be employed.

It is preferred to employ the nitric acid in excess: from 1 to 100 times by weight the quantity of tetralone. A larger excess, however, is not prejudicial to the reaction yield.

The duration of the reaction, i. e. the reaction period preferably employed according to the invention, is of the order of from 30 minutes to 2 hours. Too short a reaction period may not allow the organic diacid stage to be attained, while an unduly long reaction period may result in a considerable degradation of the diacid.

The reaction can be accelerated and rendered selective by the use of one or more oxidation catalysts, such as the nitrates of silver, lead, bismuth, iron, nickel, cobalt, manganese, chromium, vanadium, molybdenum, copper, etc.

Upon completion of the reaction and cooling of the reaction mixture, there is deposited a mixture of ortho-carboxyhydrocinnamic acid and phthalic acid, the latter being formed by a concomitant reaction. The phthalic acid is selectively redissolved in the form of the sodium acid phthalate, the quantity of soda (sodium carbonate) to be added being previously ascertained by an acid determination carried out on the mixture of products, after such mixture has been purified by washing with benzene and filtering through activated carbon.

Typical presently-preferred embodiments of the invention are set forth, by way of illustration, in the examples which follow. In such examples, the temperatures are set forth in degrees centigrade. Parts are by weight.

Example 1

Into a receptacle containing 387 parts of nitric acid of a density of 1.29—which receptacle may preferably be of spherical configuration and of a capacity of about 600 parts, and is advantageously provided with cooling means and with an efficient stirrer—there are added dropwise 33 parts of tetralone in the course of 20 minutes, after which the temperature of the mixture is maintained at 100° for 30 minutes.

Then, after cooling, the separated crystals are washed with benzene, to eliminate only partially reacted products, and are then brought into solution in the form of the sodium salts. The solution is treated with animal black in order definitively to eliminate all impurities, and especially nitrated products (which may be preliminarily reduced with the aid of a metal and an acid).

Reprecipitation is effected with a mineral acid, and then the calculated quantity of soda is added in order selectively to dissolve the phthalic acid in the form of its acid salt.

In this way, there are obtained:

14.3 parts of o-carboxy-hydrocinnamic acid,
0 part of phthalic acid.

After evaporation of the mother liquors, there are deposited:

1.5 parts of o-carboxy-hydrocinnamic acid,
3.2 parts of phthalic acid, i. e. a total amount of:

15.8 parts of o-carboxy-hydrocinnamic acid,
3.2 parts of phthalic acid.

Example 2

The procedure according to the first paragraph of Example 1 is repeated, except that the nitric acid of a density of 1.29 also contains 3.78 parts of an aqueous solution of chromic nitrate of a density of 1.26.

While otherwise proceeding as set forth in Example 1, there are obtained:

18.8 parts of o-carboxy-hydrocinnamic acid,
0.4 part of phthalic acid, and from the evaporated mother liquors:

1.6 parts of o-carboxy-hydrocinnamic acid,
2.5 parts of phthalic acid, i. e. a total amount of:

20.4 parts of o-carboxy-hydrocinnamic acid,
2.9 parts of phthalic acid.

Example 3

The procedure according to the first paragraph of Example 1 is repeated, except that the nitric acid also contains 0.15 part of ammonium vanadate.

While otherwise proceeding as set forth in Example 1, there are obtained:

21.2 parts of o-carboxy-hydrocinnamic acid,
4.2 parts of phthalic acid, and, from the mother liquors, after evaporation:

1.6 parts of o-carboxy-hydrocinnamic acid,
5 parts of phthalic acid, i. e. a total amount of:

22.8 parts of o-carboxy-hydrocinnamic acid,
9.2 parts of phthalic acid.

Example 4

The procedure according to the first paragraph of Example 1 is repeated, except that the nitric acid also contains 0.15 part of ammonium vanadate and 0.15 part of cupric nitrate.

While otherwise proceeding as set forth in Example 1, there are obtained:

22.1 parts of o-carboxy-hydrocinnamic acid,
2.2 parts of phthalic acid, and from evaporated mother liquors:

1.8 parts of o-carboxy-hydrocinnamic acid,
4.3 parts of phthalic acid, i. e. a total amount of:

23.9 parts of o-carboxy-hydrocinnamic acid,
6.5 parts of phthalic acid.

Example 5

The procedure according to the first paragraph of Example 1 is repeated except that the nitric acid also contains 0.2 part of $AgNO_3$ and that tetralone is added dropwise in the course of 30 minutes.

While otherwise proceeding as set forth in Example 1, there are obtained after evaporation of the mother liquors a total amount of:

16.3 parts of o-carboxy-hydrocinnamic acid,
6.3 parts of phthalic acid.

Example 6

The procedure according to the first paragraph of Example 1 is repeated except that the nitric acid also contains 0.2 part of $Cu(NO_3)_2$ and that tetralone is added dropwise in the course of 30 minutes.

While otherwise proceeding as set forth in Example 1, there are obtained after evaporation of the mother liquors a total amount of:

18.7 parts of o-carboxy-hydrocinnamic acid,
2.1 parts of phthalic acid.

Example 7

The procedure according to the first paragraph of Example 1 is repeated except that the nitric acid also contains 0.2 part of $Bi(NO_3)_3$ and that tetralone is added dropwise in the course of 30 minutes.

While otherwise proceeding as set forth in Example 1, there are obtained after evaporation of the mother liquors a total amount of:

18.5 parts of o-carboxy-hydrocinnamic acid,
4.1 parts of phthalic acid.

Example 8

The procedure according to the first paragraph of Example 1 is repeated except that the nitric acid also contains 0.2 part of $NH_4VO_3$ and that tertalone is added dropwise in the course of 30 minutes.

While otherwise proceeding as set forth in Example 1, there are obtained after evaporation of the mother liquors a total amount of:

18.6 parts of o-carboxy-hydrocinnamic acid,
9.2 parts of phthalic acid.

Example 9

The procedure according to the first paragraph of Example 1 is repeated except that the nitric acid also contains 0.2 part of $MnO_2$ and that tetralone is added dropwise in the course of 30 minutes.

While otherwise proceeding as set forth in Example 1, there are obtained after evaporation of the mother liquors a total amount of:

20.3 parts of o-carboxy-hydrocinnamic acid,
7.8 parts of phthalic acid.

Example 10

The procedure according to the first paragraph of Example 1 is repeated except that the nitric acid also contains 0.2 part of $(NH_4)_2MoO_4$ and that tetralone is added dropwise in the course of 30 minutes.

While otherwise proceeding as set forth in Example 1, there are obtained after evaporation of the mother liquors a total amount of:

17 parts of o-carboxy-hydrocinnamic acid,
7.3 parts of phthalic acid.

Example 11

The procedure according to the first paragraph of Example 1 is repeated except that the nitric acid also contains 0.2 part of $HgCl_2$ and that tetralone is added dropwise in the course of 30 minutes.

While otherwise proceeding as set forth in Example 1, there are obtained after evaporation of the mother liquors a total amount of:

17.3 parts of o-carboxy-hydrocinnamic acid,
5.5 parts of phthalic acid.

Example 12

The procedure according to the first paragraph of Example 1 is repeated except that the nitric acid also contains 0.2 part of $Cr(NO_3)_3$ and that tetralone is added dropwise in the course of 30 minutes.

While otherwise proceeding as set forth in Example 1, there are obtained after evaporation of the mother liquors a total amount of:

20 parts of o-carboxy-hydrocinnamic acid,
2.9 parts of phthalic acid.

Example 13

The procedure according to the first paragraph of Example 1 is repeated except that the nitric acid also contains 0.2 part of $Fe(NO_3)_3$ and that tetralone is added dropwise in the course of 30 minutes.

While otherwise proceeding as set forth in Example 1, there are obtained after evaporation of the mother liquors a total amount of:

19.9 parts of o-carboxy-hydrocinnamic acid,
4.5 parts of phthalic acid.

Example 14

The procedure according to the first paragraph of Example 1 is repeated except that the nitric acid also contains 0.2 part of $Co(NO_3)_2$ and that tetralone is added dropwise in the course of 30 minutes.

While otherwise proceeding as set forth in Example 1, there are obtained after evaporation of the mother liquors a total amount of:

18.6 parts of o-carboxy-hydrocinnamic acid,
4.2 parts of phthalic acid.

Example 15

The procedure according to the first paragraph of Example 1 is repeated except that the nitric acid also contains 0.2 part of $Ni(NO_3)_2$ and that tetralone is added dropwise in the course of 30 minutes.

While otherwise proceeding as set forth in Example 1, there are obtained after evaporation of the mother liquors a total amount of:

16 parts of o-carboxy-hydrocinnamic acid,
7 parts of phthalic acid.

Example 16

The procedure according to the first paragraph of Example 1 is repeated except that the nitric acid also contains 0.1 part of $Cu(NO_3)_2$ and 0.1 part of $NH_4VO_3$ and that tetralone is added dropwise in the course of 30 minutes.

While otherwise proceeding as set forth in Example 1, there are obtained after evaporation of the mother liquors a total amount of:

23.9 parts of o-carboxy-hydrocinnamic acid,
6.5 parts of phthalic acid.

Example 17

The procedure according to the first paragraph of Example 1 is repeated except that the nitric acid also contains 0.1 part of $(NH_4)_2MoO_4$ and 0.1 part of $NH_4VO_3$ and that tetralone is added dropwise in the course of 30 minutes.

While otherwise proceeding as set forth in Example 1, there are obtained after evaporation of the mother liquors a total amount of:

17.9 parts of o-carboxy-hydrocinnamic acid,
10.4 parts of phthalic acid.

Example 18

The procedure according to the first paragraph of Example 1 is repeated except that the nitric acid also contains 0.1 part of $AgNO_3$ and 0.1 part of $NH_4VO_3$ and that tetralone is added dropwise in the course of 30 minutes.

While otherwise proceeding as set forth in Example 1, there are obtained after evaporation of the mother liquors a total amount of:

16.9 parts of o-carboxy-hydrocinnamic acid,
7.4 parts of phthalic acid.

Example 19

The procedure according to the first paragraph of Example 1 is repeated except that the nitric acid also contains 0.1 part of $Cr(NO_3)_3$ and 0.1 part of $NH_4VO_3$ and that tetralone is added dropwise in the course of 30 minutes.

While otherwise proceeding as set forth in Example 1, there are obtained after evaporation of the mother liquors a total amount of:

17.7 parts of o-carboxy-hydrocinnamic acid,
8.3 parts of phthalic acid.

Example 20

The procedure according to the first paragraph of Example 1 is repeated except that the nitric acid also contains 0.1 part of $Fe(NO_3)_3$ and 0.1 part of $Cr(NO_3)_3$ and that tetralone is added dropwise in the course of 30 minutes.

While otherwise proceeding as set forth in Example 1, there are obtained after evaporation of the mother liquors a total amount of:

17.5 parts of o-carboxy-hydrocinnamic acid,
8.8 parts of phthalic acid.

Example 21

The procedure according to the first paragraph of Example 1 is repeated except that the nitric acid also contains 0.1 part of $MnO_2$ and 0.1 part of $Cr(NO_3)_3$ and that tetralone is added dropwise in the course of 30 minutes.

While otherwise proceeding as set forth in Example 1, there are obtained after evaporation of the mother liquors a total amount of:

18.1 parts of o-carboxy-hydrocinnamic acid,
9 parts of phthalic acid.

Example 22

The procedure according to the first paragraph of Example 1 is repeated except that the nitric acid also contains 0.1 part of $K_2CrO_4$ and 0.1 part of $(NH_4)_2MoO_4$ and that tetralone is added dropwise in the course of 30 minutes.

While otherwise proceeding as set forth in Example 1, there are obtained after evaporation of the mother liquors a total amount of:

17.4 parts of o-carboxy-hydrocinnamic acid,
5.1 parts of phthalic acid.

Example 23

The procedure according to the first paragraph of Example 1 is repeated except that the nitric acid also contains 0.1 part of $Cu(NO_3)_2$ and 0.1 part of $(NH_4)_2MoO_4$ and that tetralone is added dropwise in the course of 30 minutes.

While otherwise proceeding as set forth in Example 1, there are obtained after evaporation of the mother liquors a total amount of:

15.4 parts of o-carboxy-hydrocinnamic acid,
7.2 parts of phthalic acid.

Example 24

The procedure according to the first paragraph of Example 1 is repeated except that the nitric acid of a density of 1.24 also contains 0.2 part of ammonium vanadate and 0.2 part of cupric nitrate and that 34 parts of tetralone are added dropwise in the course of 30 minutes.

While otherwise proceeding as set forth in Example 1, there are obtained after evaporation of the mother liquors a total amount of:

19.4 parts of o-carboxy-hydrocinnamic acid,
4.9 parts of phthalic acid.

Example 25

The procedure according to Example 24 is repeated except that the nitric acid is of a density of 1.29 and 40 parts of tetralone are added.

While otherwise proceeding as set forth in Example 1, there are obtained after evaporation of the mother liquors a total amount of:

22.5 parts of o-carboxy-hydrocinnamic acid,
2 parts of phthalic acid.

Example 26

The procedure according to Example 24 is repeated except that the nitric acid is of a density of 1.34 and 47.2 parts of tetralone are added.

While otherwise proceeding as set forth in Example 1, there are obtained after evaporation of the mother liquors a total amount of:

19.9 parts of o-carboxy-hydrocinnamic acid,
2.7 parts of phthalic acid.

Example 27

The procedure according to Example 24 is repeated except that the nitric acid of a density of 1.38 and 53.5 parts of tetralone are added.

While otherwise proceeding as set forth in Example 1, there are obtained after evaporation of the mother liquors a total amount of:

17.7 parts of o-carboxy-hydrocinnamic acid,
2.6 parts of phthalic acid.

Example 28

The procedure according to the first paragraph of Example 1 is repeated except that 22 parts of tetralone are added dropwise in the course of 30 minutes in 266 parts of $HNO_3$ of a density of 1.33 which also contains 0.1 part of $NH_4VO_3$ and 0.1 part of $Cu(NO_3)_2$ and that the temperature of the mixture is maintained at 75° C. for one hour.

While otherwise proceeding as set forth in Example 1, there are obtained, after evaporation of the mother liquors, a total amount of:

2 parts of o-carboxy-hydrocinnamic acid,
1 part of phthalic acid.

Example 29

The procedure according to Example 28 is repeated except that the temperature of the mixture is maintained at 90° C. for an hour.

While otherwise proceeding as set forth in Example 1, there are obtained, after evaporation of the mother liquors, a total amount of:

7.5 parts of o-carboxy-hydrocinnamic acid,
3.5 parts of phthalic acid.

Example 30

The procedure according to Example 28 is repeated except that the temperature of the mixture is maintained at 105° C. for an hour.

While otherwise proceeding as set forth in Example 1, there are obtained, after evaporation of the mother liquors, a total amount of:

9.3 parts of o-carboxy-hydrocinnamic acid,
3.9 parts of phthalic acid.

Example 31

The procedure according to Example 28 is repeated except that the temperature of the mixture is maintained at 115° C. for an hour.

While otherwise proceeding as set forth in Example 1, there are obtained, after evaporation of the mother liquors, a total amount of:

6.5 parts of o-carboxy-hydrocinnamic acid,
2.7 parts of phthalic acid.

Example 32

Into a column for nitric oxidation are introduced simultaneously in a continuous manner tetralone and nitric acid at such respective rates that 110 parts of tetralone and 6,800 parts of nitric acid of a density of 1.26 are added in the course of 30 minutes; said nitric acid containing 0.0025 part of ammonium vanadate and 0.0025 part of cupric nitrate. The temperature of the mixture being maintained at 110° C. during the operation and while otherwise proceeding as set forth in Example 1, there are obtained for each period of 30 minutes, after evaporation of the mother liquors, a total amount of:

93 parts of o-carboxy-hydrocinnamic acid,
42 parts of phthalic acid.

The term "tetralone," as used in this specification and in the appended claims, designates α-tetralone

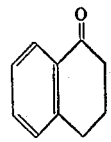

Having thus disclosed the invention, what is claimed is:

1. A process for the preparation of orthocarboxyhydrocinnamic acid and phthalic acid, which comprises oxidizing tetralone by means of nitric acid having a density of 1.20 to 1.40, at a temperature between 75 and 125° C. for a period of 30 minutes to 2 hours, the nitric acid being present in an excess of 1 to 100 times the weight of the tetralone.

2. A process for the preparation of orthocarboxyhydrocinnamic acid which comprises oxidizing tetralone in the liquid phase by means of nitric acid having a density of 1.20 to 1.40, at a temperature between 75 and 125° C. for a period of 30 minutes to 2 hours, the nitric acid being present in an excess of 1 to 100 times the weight of the tetralone.

3. A process for the preparation of orthocarboxyhydrocinnamic acid which comprises oxidizing tetralone in the liquid phase by means of nitric acid having a density of 1.20 to 1.40 at a temperature between 75 and 125° C. under atmospheric pressure for a period of 30 minutes to 2 hours, the nitric acid being present in an excess of 1 to 100 times the weight of the tetralone.

4. A process for the preparation of orthocarboxyhydrocinnamic acid which comprises oxidizing tetralone in the liquid phase by means of nitric acid having a density of 1.20 to 1.40 at a temperature between 75 and 125° C. for a period of 30 minutes to 2 hours in the presence of an oxidation catalyst, the nitric acid being present in an excess of 1 to 100 times the weight of the tetralone.

5. A process for the preparation of orthocarboxyhydrocinnamic acid which comprises oxidizing tetralone in the liquid phase by means of nitric acid having a density of 1.24 to 1.38 at a temperature of between 75 and 125° C. for a period of 30 minutes to 2 hours in the presence of an oxidation catalyst, the nitric acid being present in an excess of 1 to 100 times the weight of the tetralone.

6. A process for the preparation of orthocarboxyhydrocinnamic acid which comprises oxidizing tetralone in the liquid phase by means of nitric acid having a density of 1.24 to 1.38 at a temperature between 75 to 125° C. for a period of 30 minutes to 2 hours under atmospheric pressure in the presence of an oxidation catalyst, the nitric acid being present in an excess of 1 to 100 times the weight of the tetralone.

7. A process for the preparation of orthocarboxyhydrocinnamic acid which comprises oxidizing tetralone in the liquid phase by means of nitric acid having a density of 1.24 to 1.38 at a temperature between 75 to 125° C. for a period of 30 minutes to 2 hours under atmospheric pressure in the presence of cupric nitrate as catalyst, the nitric acid being present in an amount of 1 to 100 times the weight of the tetralone.

8. A process for the preparation of orthocarboxyhydrocinnamic acid which comprises oxidizing tetralone in the liquid phase by means of nitric acid having a density of 1.24 to 1.38 at a temperature between 75 to 125° C. for a period of 30 minutes to 2 hours under atmospheric pressure in the presence of ammonium vanadate catalyst, the nitric acid being present in an amount of 1 to 100 times the weight of the tetralone.

9. A process for the preparation of orthocarboxyhydrocinnamic acid which comprises oxidizing tetralone in the liquid phase by means of nitric acid having a density of 1.24 to 1.38 at a temperature between 75 to 125° C. for a period of 30 minutes to 2 hours under atmospheric pressure in the presence of cupric nitrate and ammonium vanadate as catalysts, the nitric acid being present in an amount of 1 to 100 times the weight of the tetralone.

References Cited in the file of this patent

UNITED STATES PATENTS

| | | |
|---|---|---|
| 2,267,377 | Olin et al. | Dec. 23, 1941 |
| 2,360,673 | Hanford | Oct. 17, 1944 |